July 15, 1958 A. HERLET 2,843,516

SEMICONDUCTOR JUNCTION RECTIFIER

Filed Feb. 13, 1956

United States Patent Office 2,843,516 Patented July 15, 1958

2,843,516

SEMICONDUCTOR JUNCTION RECTIFIER

Adolf Herlet, Pretzfeld, Bavaria, Germany, assignor to Siemens-Schuckertwerke Aktiengesellschaft, Berlin-Siemensstadt, Germany, a corporation of Germany Application February 13, 1956, Serial No. 565,144

14 Claims. (Cl. 148—33)

Figures 1, 2:
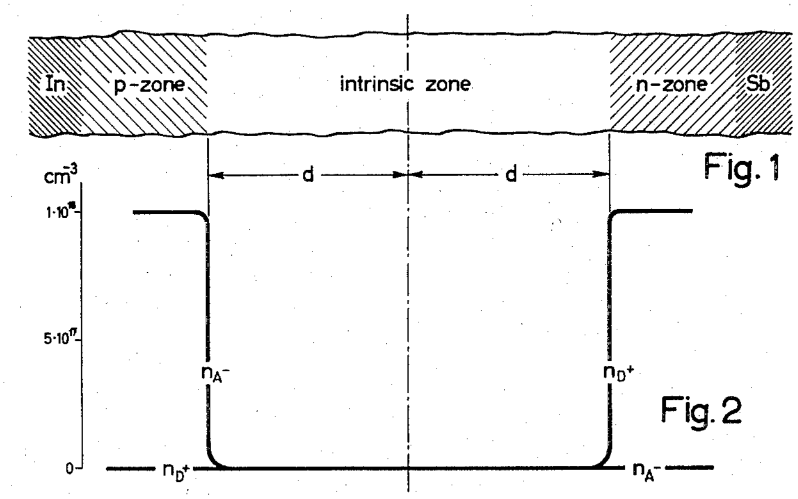

My invention relates to semiconductor rectifiers of the junction type.

It is known to make such rectifiers of pellets or small plates of essentially monocrystalline semiconductor material, for example germanium, silicon, and certain binary compounds of respective elements from the third and fifth groups of the periodic system, such as indium arsenide or indium antimonide. For producing the asymmetric resistance needed for rectification, these semiconductor bodies have an excess-conductance (n-type) zone and a defect-conductance (p-type) zone. In one kind of junction rectifier these two zones, both relatively highly doped with lattice-defect atoms to exhibit mutually opposed types of conductance, are directly adjacent to each other and form a p-n junction of a width in the order of a few microns. In another kind of such rectifiers, the two zones are separated from each other by a comparatively wide middle zone in the order of magnitude of 100 microns. In the middle zone the lattice-defect concentration, or rather the impurity-center concentration is lower by some powers of ten than in the highly doped marginal zones, or the middle zone may even have virtually intrinsic conductance. Said concentration is herein defined in terms of the number of impurity atoms per cubic centimeter. The latter kind of junction rectifier is called "p-s-n rectifier" or "p-i-n" rectifier. The presence of the middle zone makes it possible to combine in such a rectifier the otherwise somewhat conflicting qualities of good forward conductance and high inverse blocking. This possibility of particularly favorable rectifier qualities, however, is not realizable or reliably reproducible simply by virtue of such a middle zone. The rectifiers, rather, may exhibit just the contrary behavior. This is, it may occur that they have poorer rectification properties than an otherwise similar rectifier without the middle zone. This has limited the qualities reliably attainable by industrial mass production. Another troublesome problem is the fact that the known rectifiers of this kind do not necessarily afford optimum qualities within the upwardly limited temperature range maintainable by the technically available or economically feasible cooling means.

In the appended claims the term "impurity-center concentration" is employed. A lattice defect may consist not only of impurities but also in other irregularity of the crystal lattice of the semiconductor proper. The term "impurity-center concentration" distinguishes from the latter.

It is an object of my invention, to eliminate these shortcomings and to afford an economical manufacture of high-quality rectifiers of predetermined optimum rectifying properties within the temperature range controllable by the usual cooling devices such as cooling structures of good conducting material, for instance silver or copper, in heat exchange with a forced flow of gaseous or liquid coolant.

The invention involves the recognition that such superior semiconductor junction rectifiers of predeterminably good rectifying qualities are obtained by maintaining the width of the middle zone within certain limits in correlation to the degree of doping or said type of lattice defection-point concentration in the respective junction zones. More specifically, according to the invention, the composition of the crystalline semiconductor body and the dimension of its middle zone are interrelated to satisfy these requirements: The half-width of the middle zone, that is the dimension of the middle zone from its center axis to either one of the highly doped outer zones of n-type or p-type conductance, is made not larger than twice the high-voltage diffusion length in the middle zone. This diffusion length, for any given semiconductor substance, is a substantially fixed saturation value for all voltages above a certain range. In conjunction with such limitation in width, the lattice-defect concentration, or rather the impurity-center concentration, in the middle zone must be below $10^{15}$ cm.$^{-3}$, and the defect concentration in the highly doped outer zones must not be more than two powers of ten below the value given by the critical boundary field strength. As will be shown, these requirements can readily be satisfied by suitable selection and dimensioning of the monocrystalline semiconductor material and its zones, and by applying the known thermal processing methods, such as zone melting, to produce the necessary degrees of impurity-center lattice-defect concentration.

The invention will be further described with reference to the drawing in which Fig. 1 shows schematically a cross-section through a small p-i-n rectifier member with a wide middle zone; Figs. 2 to 5 show respective coordinate diagrams explanatory of the same rectifier; and Fig. 6 illustrates in perspective an example of a complete rectifier unit according to the invention.

The junction rectifier according to Fig. 1, consisting essentially of a monocrystal of germanium, is provided with electrode coatings for instance of indium (In) and antimony (Sb). Three zones can be distinguished: A highly doped p-zone contacted by indium, a practically intrinsically conductive middle zone of the width $2d$, and an n-zone contacted by antimony.

Figure 3:
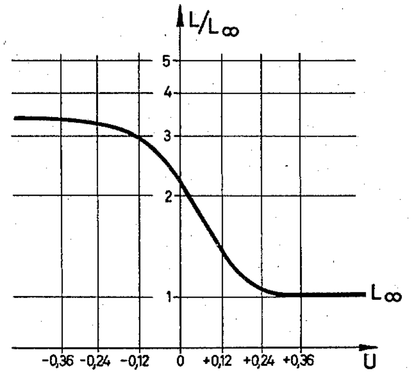

Fig. 2 shows schematically the local distribution of the doping (acceptor and donor) concentration $n_{A-}$ and $n_{D+}$ along the length of the rectifier cross section. The requirement for a good forward conductance characteristic places a certain upper limit upon the length of the middle zone. This limit however, is not an absolutely fixed value but is determined only in relation to the high-voltage diffusion length $L_\infty$. As apparent from the diagram of Fig. 3, the diffusion length L, generally, is dependent upon the exterior voltage U applied across the rectifier. With high voltages in the forward, i. e. conductive, direction of the rectifier the value L approaches a limit valve $L_\infty$. The curve of the ratio $L/L_\infty$, illustrated in Fig. 3, is in accordance with the known conditions obtaining with germanium.

Figure 4:
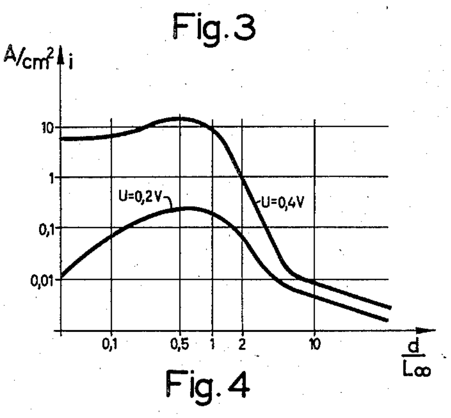

The effect of the diffusion-length limit $L_\infty$ upon the current density in the conductive or forward direction of the rectifier for a constant applied voltage U is shown in Fig. 4, for instance for the values $U=0.2$ volt and $U=0.4$ volt. It will be recognized that for $d/L_\infty > 2$ the forward current density declines very steeply, which is tantamount to a considerable impairment in forward conductance of the rectifier. Rectifiers of good forward characteristic therefore can only be obtained when the ratio $d/L_\infty$ is smaller than 2. Most favorable in this respect is the range of $d/L_\infty$ between the values 0.5 and 1. These relative values are to a large extent independent of the particular semiconductor material. The last-mentioned range for the dimensioning of the middle zone in relation to the effective diffusion length is particularly favorable for the further reason that in this range the values of current density are only slightly different from each other. Since during manufacture slight differences in zone length within the cross-section of the zone are inevitable, it is important that these differences have a smallest possible effect upon the current density because otherwise the rectifier would be differently loaded at respectively different localities thus involving the danger of local overheating. In the mentioned range between the relative values 0.5 to 1, however, the length of the middle zone may vary by a factor up to 2 without the resulting differences in current densities reaching a dangerous magnitude.

The above-mentioned dimensioning of the middle-zone width alone, however, is not sufficient for satisfactory results in accordance with the objective of the invention. It is also necessary to keep the impurity-center lattice-defect concentration in the highly doped zones at a sufficiently high magnitude. According to known practice, for improving the forward conductance characteristic, the amount of doping in the outer zones has been made as high as possible. However, I have discovered, in accordance with the present invention, that the degree of doping must not be raised above a certain limit, this being further explained below. An increase above the discovered limit may not only impair reliable reproducibility but may also be disadvantageous from the viewpoint of economical manufacture of such rectifiers. This will be understood from the following considerations in conjunction with the diagram of Fig. 5.

Figure 5:
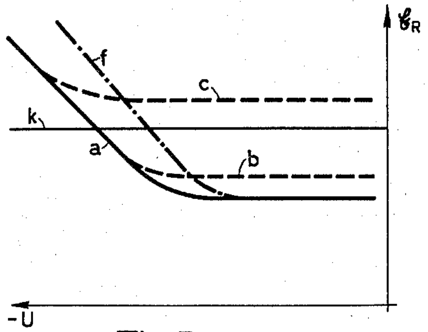
Figure 6:
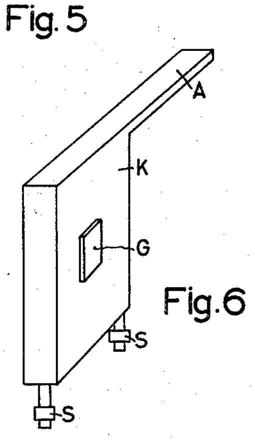

Fig. 5 shows on a logarithmic scale the curve of the field strength $\epsilon_R$ at the boundary of the middle zone, i. e. at the junction or transition between the highly doped outer zone to the low impurity-center lattice-defect concentration of the middle zone, in dependence upon the voltage $-U$ applied in the inverse or blocking direction of the rectifier. The full-line curve *a* applies to given values of the impurity-center lattice-defect concentration in the outer zone and in the middle zone. Relative to curve *a*, the broken-line curves *b* and *c* indicate how the field strength changes when the impurity-center defect concentration of the outer zone is given two higher values respectively. The dot-and-dash curve *f* represents the change of the field strength resulting from increased doping of the middle zone. Also indicated by a horizontal line is the constant value *k* of the critical boundary field strength at which the Zenner effect occurs and the rectifier loses its blocking ability.

It follows from the diagram that the amount of doping in the outer zones has no effect upon the blocking properties of the rectifier as long as this amount remains below the limit determined by the critical field strength *k*. Only if the impurity-center lattice-defect concentration in the outer zone is increased to such an extent that, at least locally, it closely approaches or even exceeds the limit, has the increase in impurity-center lattice-defect concentration, aside from improving the forward characteristic, also the effect of impairing the blocking properties, i. e. of reducing the peak inverse voltage. Now, I have discovered that it suffices to have the amount of doping in the outer zones stay below the critical limit by a certain safe distance which assures preserving optimum blocking properties and at which a relatively small forward voltage results in current densities of such a high magnitude that it just remains possible to cope with them by cooling techniques. Improving the forward characteristic in the region of still higher current densities, such as afforded by further increase in impurity-center lattice-defect concentration within the outer zones, could no longer be utilized in practice and would even be undesirable in view of the danger to the blocking ability resulting from the fact that, due to inevitable non-uniformities throughout the entire rectifier cross section, the critical limit may already be exceeded at certain localities although the impurity-center lattice-defect concentration at other points may still not have reached a dangerous magnitude. However, the quality of the rectifier is always determined by the weakest spot. Since now the mentioned critical limit for the impurity-center lattice-defect concentration in the outer zone is at $10^{19}$ cm.$^{-3}$, the range of concentration in the outer zones to be employed in accordance with the present invention, as explained in the foregoing, is between $10^{17}$ and $10^{19}$ cm.$^{-3}$. To be preferred is an impurity-center lattice-defect concentration in the outer zones of approximately $10^{18}$ cm.$^{-3}$.

It is a known fact, manifested by curve *f* in comparison with curve *a* in Fig. 5, that the blocking voltage increases with the reduction in impurity-center lattice-defect concentration in the middle zone. Consequently, in order to obtain a highest possible peak inverse voltage the impurity-center lattice-defect concentration in the middle zone must be made as small as possible, for instance at least two to three powers of ten lower than in the highly doped outer zones. However, according to another recognition involved in my invention, it is not advantageous to keep the impurity-center lattice-defect concentration in the middle zone below a certain limit. If, for instance, the impurity-center lattice-defect concentration in the middle zone is reduced to $10^{14}$ cm.$^{-3}$, then the blocking voltage is already so high that its full utilization, requiring a corresponding dissipation of the power losses in the rectifier, would become difficult with feasible cooling techniques. A further increase in blocking ability by reducing the said lattice-defect concentration in the middle zone below $10^{14}$ cm.$^{-3}$, therefore, can hardly be utilized in view of the available cooling possibilities, particularly in view of the fact that, generally, such an increase is accompanied by an increase in blocking current though this current increase may be small. Consequently, the values of said lattice-defect concentration in the middle zone best suitable for the purposes of the present invention are those between $2\times10^{14}$ and $6\times10^{14}$ cm.$^{-3}$.

Fig. 6 shows a rectifier unit G in the shape of a flat prism whose rear side is soldered to a block K of copper. The copper block is hollow or traversed by channels and is provided with nipples S for attaching supply and discharge conduits for liquid coolant, such as water, liquid air or the like. The coolant is delivered from a suitable pressure device at a high velocity of flow to pass through the interior of the cooling block K. The cooling block is provided with a terminal lug A to which an electric lead is to be connected. The other electric lead or terminal lug can be directly soldered to rectifier G on the front face visible on the drawing. Instead, the rectifier G may also be provided on its front face with a cooling block similar to the one illustrated. The direction from the front face to the rear side of the rectifier G is the above-mentioned cross-sectional "length" along which the different zones, shown one beside the other in Fig. 1, follow each other. The total length of the rectifier member measured in this direction may amount, for instance, to about 0.5 mm. The middle zone of low impurity-center lattice-defect concentration occupies approximately $2d=0.3$ mm. The area of the rectifier, which coincides in magnitude with the front face visible in Fig. 6, may amount to 0.5 cm.$^2$. Such a rectifier, made of germanium as the basic material and embodying a middle-zone of a length ($2d$) and impurity-center lattice-defect concentrations in the middle and outer zones as described above, can be subjected to a peak inverse voltage of approximately 260 volts, and can be loaded in the forward direction by a current of approximately 40 amps. peak value.

As mentioned, the individual processing steps required for the manufacture of rectifiers according to the invention are in accordance with the techniques known and practiced generally in the manufacture of germanium and silicon junction rectifiers. However, for further illustration, a description of a manufacturing method suitable for the purpose of the invention will now be given.

A monocrystalline semiconductor rod, for instance of germanium, is first purified by zone melting down to a lattice-defect concentration far below $10^{14}$ cm.$^{-3}$. Thereafter an impurity of the desired type is zone-melted into the germanium body in a dosage corresponding to an impurity-center lattice-defect concentration between $2\times10^{14}$ cm.$^{-3}$ and $6\times10^{14}$ cm.$^{-3}$, the concentrations being reliably measurable by measuring the electric conductance of the monocrystalline semiconductor rod.

Assume that the measured diffusion length $L_\infty$ of the material thus doped is found, for instance, to be 0.4 mm. Then a disk of, say, 0.8 mm. thickness is cut off the semiconductor rod, for instance, by means of a diamond saw. The cutting faces of the disk are polished so that a thickness of 0.7 mm. will remain. By applying the alloying processes described below, a surface zone of the polished disk is then doped from each cutting face down to a depth of approximately 0.05 mm. A weakly doped middle zone of about 0.6 mm. width will remain. The "length" value $d$ (i. e. one half of the width) of the middle zone is 0.3 mm. which is 0.75 times the diffusion length $L_\infty$ as required by the invention.

The further requirements for optimum doping of the two highly doped surface zones can be satisfied by properly conducting or controlling the alloying process as will first be described with reference to the production of the highly doped n-zone. In this case the surface zone is doped with antimony. A foil of antimony or antimony-containing alloy, for instance a foil of 0.2 mm. thickness consisting of an alloy of 90% gold and 10% antimony, is placed onto the polished surface of the germanium disk. Then the foil is kept pressed against the disk, and the foil together with the germanium disk are heated for a few minutes, for instance ten minutes, to a temperature between 650 and 700° C. As a result, the germanium becomes alloyed with the gold-antimony material so that a surface zone highly doped with antimony is formed within the germanium body. The amount of antimony doping, whose optimum is supposed to be approximately at $10^{18}$ cm.$^{-3}$, can be varied, on the one hand, by varying the antimony content of the gold-antimony foil placed upon the germanium body and, on the other hand, by properly selecting the alloying temperature upon which the solubility of the substances in each other is greatly dependent. The proper correlation of antimony contents and heating can be ascertained by sample testing. Consequently, although in the above-described specific example a foil, 2 mm. thick, of 90% Au and 10% Sb heated for ten minutes at 650 to 700° C. produced the desired result, it will be recognized that the composition of the antimony-containing foil as well as the heating temperature and heating time can be varied and, for each particular manufacture, can be properly determined by sample testing. Such testing requires determining the amount or concentration of the antimony lattice defection points in the narrow, highly doped surface zones. There is a known method suitable for this purpose. According to this method the electric potential is tapped-off by microscopic sonde electrodes within the narrow range of a doped zone, and the electric conductivity is measured between these electrodes and serves as a measure of the contents in lattice defection points. Based upon this possibility of determining the contents of lattice defections, the alloying process can be varied from specimen to specimen within a test series in order to determine from the results the alloying data, namely composition, temperature, and heating time best suitable for optimum lattice-defect concentration.

The opposite side of the germanium disk can be doped to the proper degree in an analogous manner. On this opposite side a highly doped p-zone is produced, for instance, by placing upon the polished surface of the germanium body a foil of indium, for instance of 0.2 mm.

thickness. Alloying is effected at 650 to 700° C. within a heating period approximately similar to that mentioned above. The most favorable alloying temperature resulting in the desired lattice-defect concentration, can again be determined by a series of sample tests similar to those described in the foregoing.

It will be noted that when proceeding in accordance with the above-described manufacturing method, the alloying data are first determined for securing the desired impurity-center lattice-defect concentration in the highly doped zones. Consequently the thickness of these highly doped zones can be chosen or varied only by choice of the foil thickness. The thickness of the highly doped zones, however, is only significant inasmuch as it must be considered when calculating the dimensions of the semiconductor disk if the desired length ($2d$) of the middle zone is to be attained.

It will be understood by those skilled in the art that the embodiments and possibilities of application of the invention are not exhausted by the example described in the foregoing. The invention is rather also applicable by employing the various features individually or in any suitable combination.

I claim:

1. A p-n junction rectifier, comprising a semiconductor crystal having a donor-doped n-conductive outer zone, an acceptor-doped p-conductive outer zone, and a middle zone located between, and area-joined with, said outer zones and having lesser impurity-center defect concentration than said outer zones, the dimension of said middle zone from its center to either one of said outer zones being at most twice the high-voltage diffusion length of said semiconductor crystal in said middle zone, said defect concentration of said middle zone being below $10^{15}$ cm.$^{-3}$, and said outer zones having an impurity-center defect concentration smaller by not more than two powers of ten than the concentration value corresponding to the critical boundary field strength.

2. A p-n junction rectifier, comprising a semiconductor crystal having a donor-doped n-conductive outer zone, an acceptor-doped p-conductive outer zone, and a middle zone virtually of intrinsic conductance and located between said outer zones and area-joined therewith, the dimension of said middle zone from its center to each of said respective outer zones being one-half to one times the high-voltage limit of the diffusion length in said middle zone, said defect concentration of the middle zone being below $10^{15}$ cm.$^{-3}$ and said outer zones having a lattice-defect concentration smaller by not more than two powers of ten than the concentration value corresponding to the critical boundary field strength.

3. A p-n junction rectifier, comprising a semiconductor crystal having a donor-doped n-conductive outer zone, an acceptor-doped p-conductive outer zone, and a middle zone located between said outer zones and area-joined therewith, said middle zone having an impurity-center defect concentration between $2\times10^{14}$ and $6\times10^{14}$ cm.$^{-3}$, the dimension of said middle zone from its center to either one of said outer zones being at most twice the high-voltage diffusion length of a said semiconductor crystal in said middle zone, and said outer zones having an impurity-center defect concentration smaller by not more than two powers of ten than the concentration value corresponding to the critical boundary field strength.

4. A p-n junction rectifier, comprising a semiconductor crystal having a donor-doped n-conductive outer zone, an acceptor-doped p-conductive outer zone, and a middle zone located between said outer zones and area-joined therewith, said middle zone having an impurity-center defect concentration between $2\times10^{14}$ and $6\times10^{14}$ cm.$^{-3}$, the dimention of said middle zone from its center to either one of said outer zones being at most twice the high-voltage diffusion length of said semiconductor crystal in said middle zone, and said outer zones having an impurity-center defect concentration between $10^{17}$ and $10^{19}$ cm.$^{-3}$.

5. In a p-n junction rectifier according to claim 1, said outer zones having an impurity-center defect concentration approximately of $10^{18}$ cm.$^{-3}$.

6. A p-n junction rectifier, comprising a germanium semiconductor crystal having a donor-doped n-conductive outer zone, an acceptor-doped p-conductive outer zone, and a middle zone located between said outer zones and area-joined therewith, said middle zone having an impurity-center lattice-defect concentration between $2\times10^{14}$ and $6\times10^{14}$ cm.$^{-3}$, the dimension of said middle zone from its center to either one of said outer zones being at most twice the high-voltage diffusion length of said semiconductor crystal in said middle zone, and said outer zones having an impurity-center lattice-defect concentration smaller by not more than two powers of ten than the concentration value corresponding to the critical boundary field strength.

7. A p-n junction rectifier, comprising a germanium semiconductor crystal having a donor-doped n-conductive outer zone, an acceptor-doped p-conductive outer zone, and a middle zone located between said outer zones and area-joined therewith, said middle zone having an impurity-center concentration between $2\times10^{14}$ and $6\times10^{14}$ cm.$^{-3}$, the dimension of said middle zone from its center to either one of said outer zones being at most twice the high-voltage diffusion length of said semiconductor crystal in said middle zone, and said outer zones having an impurity-center concentration between $10^{17}$ and $10^{19}$ cm.$^{-3}$.

8. A p-n junction rectifier, comprising a germanium semiconductor crystal having a donor-doped n-conductive outer zone, the dope being antimony, an acceptor-doped p-conductive outer zone, the dope of the p-conductive zone being indium, and a middle zone located between said outer zones and area-joined therewith, said middle zone having an impurity-center lattice-defect concentration between $2\times10^{14}$ and $6\times10^{14}$ cm.$^{-3}$, the dimension of said middle zone from its center to either one of said outer zones being 0.5 to 1.0 times the high-voltage diffusion length of said semiconductor crystal in said middle zone, and said outer zones having an impurity-center lattice-defect concentration between $10^{17}$ and $10^{19}$ cm.$^{-3}$.

9. A p-n junction rectifier, comprising a silicon semiconductor crystal having a donor-doped n-conductive outer zone, an acceptor-doped p-conductive outer zone, and a middle zone located between said outer zones and area-joined therewith, said middle zone having an impurity-center concentration between $2\times10^{14}$ and $6\times10^{14}$ cm.$^{-3}$, the dimension of said middle zone from its center to either one of said outer zones being at most twice the high-voltage diffusion length of said semi-conductor crystal in said middle zone, and said outer zones having an impurity-center concentration smaller by not more than two powers of ten than the concentration value corresponding to the critical boundary field strength.

10. A p-n junction rectifier, comprising a semi-conductor crystal having a donor-doped n-conductive outer zone, an acceptor-doped p-conductive outer zone, and a middle zone having an impurity-center lattice-defect concentration below $10^{15}$ cm.$^{-3}$ located between said outer zones and area-joined therewith, the dimension of said middle zone from its center to each of said respective outer zones being one-half to one times the high-voltage limit of the diffusion length in said middle zone, and said outer zones having an impurity-center lattice-defect concentration smaller by not more than two powers of ten than the concentration value corresponding to the critical boundary field strength.

11. A p-n junction rectifier, comprising a germanium semiconductor crystal having a donor-doped n-conductive outer zone, an acceptor-doped p-conductive outer zone, and a middle zone having an impurity-center concentration below $10^{15}$ cm.$^{-3}$ and located between said outer zones and area-joined therewith, the dimension of said middle zone from its center to each of said respective outer zones being one-half to one times the high-voltage limit of the diffusion length in said middle zone, and said outer zones having an impurity-center concentration smaller by not more than two powers of ten than the concentration value corresponding to the critical boundary field strength.

12. The apparatus of claim 10 in which the semi-conductor is silicon.

13. A p-n junction rectifier, comprising a semi-conductor crystal having a donor-doped n-conductive outer zone, an acceptor-doped p-conductive outer zone, and a middle zone having an impurity-center defect concentration below $10^{15}$ cm.$^{-3}$ located between said outer zones and area-joined therewith, the dimension of said middle zone from its center to each of said respective outer zones being one-half to one times the high-voltage limit of the diffusion length in said middle zone, and said outer zones having an impurity-center defect concentration smaller by not more than two powers of ten than the concentration value corresponding to the critical boundary field strength, the rectifier having, at its rated current, a ratio of current density to the said high-voltage limit of the diffusion length in the range of between approximately 0.5 and 1.

14. A p-n junction rectifier, comprising a germanium semi-conductor crystal having a donor-doped n-conductive outer zone, an acceptor-doped p-conductive outer zone, and a middle zone having an impurity-center lattice-defect concentration below $10^{15}$ cm.$^{-3}$ and located between said outer zones and area-joined therewith, the dimension of said middle zone from its center to each of said respective outer zones being one-half to one times the high-voltage limit of the diffusion length in said middle zone, and said outer zones having an impurity-center lattice-defect concentration smaller by not more than two powers of ten than the concentration value corresponding to the critical boundary field strength, the rectifier having, at its rated current, a ratio of current density to the said high-voltage limit of the diffusion length in the range of between approximately 0.5 and 1.

References Cited in the file of this patent

UNITED STATES PATENTS 2,708,646 North ---------------- May 17, 1955
2,767,358 Early ---------------- Oct. 16, 1956